(12) United States Patent
Berry et al.

(10) Patent No.: US 6,867,729 B2
(45) Date of Patent: Mar. 15, 2005

(54) GUIDED WAVE RADAR LEVEL TRANSMITTER WITH AUTOMATIC VELOCITY COMPENSATION

(75) Inventors: James M. Berry, LaGrange, IL (US); Alan M. Gard, Warrenville, IL (US)

(73) Assignee: Magnetrol International, Downers Grove, IL (US)

( * ) Notice: Subject to any disclaimer, the term of this patent is extended or adjusted under 35 U.S.C. 154(b) by 96 days.

(21) Appl. No.: 10/630,564

(22) Filed: Jul. 30, 2003

(65) Prior Publication Data

US 2005/0024259 A1 Feb. 3, 2005

(51) Int. Cl.[7] .......................... G01S 13/08; G01S 13/00; G01S 7/40
(52) U.S. Cl. ...................... 342/124; 342/118; 342/134; 342/165; 342/173; 342/174; 342/175; 342/195; 73/290 R; 73/304 R
(58) Field of Search .......................... 73/290 R, 304 R, 73/304 C, 322.5, 305–322; 342/118, 124, 125, 128, 134, 135, 136, 137, 145, 165, 169–175, 192–197

(56) References Cited

U.S. PATENT DOCUMENTS

| | | | | |
|---|---|---|---|---|
| 4,210,023 A | * | 7/1980 | Sakamoto et al. | 73/290 R |
| 4,359,902 A | * | 11/1982 | Lawless | 73/290 R |
| 5,609,059 A | * | 3/1997 | McEwan | 73/290 R |
| 5,610,611 A | * | 3/1997 | McEwan | 342/124 |
| 5,973,637 A | * | 10/1999 | Perdue et al. | 342/124 |
| 6,054,946 A | * | 4/2000 | Lalla et al. | 342/124 |
| 6,078,280 A | * | 6/2000 | Perdue et al. | 342/124 |
| 6,184,818 B1 | * | 2/2001 | Meinel | 342/124 |
| 6,198,424 B1 | * | 3/2001 | Diede et al. | 342/124 |
| 6,229,476 B1 | * | 5/2001 | Lutke et al. | 342/124 |
| 6,255,983 B1 | * | 7/2001 | Meszaros et al. | 342/124 |
| 6,320,532 B1 | * | 11/2001 | Diede | 342/124 |
| 6,504,793 B2 | * | 1/2003 | Fuenfgeld | 342/124 |
| 6,559,657 B1 | * | 5/2003 | McCarthy et al. | 73/290 R |
| 6,626,038 B1 | * | 9/2003 | Carsella et al. | 73/290 R |
| 6,640,629 B2 | * | 11/2003 | Carsella et al. | 73/290 R |

* cited by examiner

Primary Examiner—Bernarr E. Gregory
(74) Attorney, Agent, or Firm—Wood Phillips Katz Clark & Mortimer (57) ABSTRACT

A guided wave radar transmitter comprises a probe defining a transmission line including a relatively low impedance target marker above an expected sensing region of the probe. A pulse circuit is connected to the probe for generating pulses on the transmission line and receiving a reflected signal from the transmission line. The reflected signal selectively includes a target pulse representing the target marker and a level pulse representing material along the length of the probe. A controller is operatively connected to the pulse circuit. The controller normally operates at a relatively low gain to determine a level time to the level pulse to determine material level, and periodically operates at a relatively high gain to determine a target time to the target pulse. The target time is used to compensate the level time for properties of vapor above the material level.

26 Claims, 7 Drawing Sheets

GUIDED WAVE RADAR LEVEL TRANSMITTER WITH AUTOMATIC VELOCITY COMPENSATION

FIELD OF THE INVENTION

This invention relates to an apparatus and method utilizing guided wave radar for measuring the condition or characteristics of a material, and more particularly to automatic velocity compensation.

BACKGROUND OF THE INVENTION

Knowledge of level in industrial process tanks or vessels has long been required for safe and cost-effective operation of plants. Many technologies exist for making level measurements. These include buoyancy, capacitance, ultrasonic and microwave radar, to name a few. Recent advantages in micropower impulse radar (MIR), also known as ultra-wide band (UWB) radar, in conjunction with advances in equivalent time sampling (ETS), permit development of low power and low cost time domain reflectometry (TDR) devices.

In a TDR instrument, a very fast stream of pulses with a rise time of 500 picoseconds, or less, is propagated down a transmission line that serves as a probe in a vessel. The pulses are reflected by a discontinuity caused by a change in impedance, such as at a transition between two media. For level measurement, that transition is typically where the air and the material to be measured meet. Alternatively, the transition could be two different liquids. The amplitude of the reflected signal depends on the difference between the dielectrics of the two media. The dielectric of air is one, while the dielectric of water is about eighty. The larger the difference in dielectric, the larger the reflected signal.

McEwan, U.S. Pat. No. 5,345,471, and other related patents, describe a technique to transmit and receive very fast pulses with simple, low cost and low power electronics. More particularly, McEwan, U.S. Pat. No. 5,609,059, describes a level sensor utilizing this technology. However, the device described therein is intended to be used for simple commercial level applications, such as automobile engine fluid levels. It does not utilize the feature set, power consumption, and versatility required for use in the industrial process environment. Other known devices utilize this technology for a two-wire transmitter using just two wires for both receiving power from the user and sending level information to the user, However, these devices are analog devices limited in the ability to measure the level of extremely low dielectric materials, or materials that coat, clump or build up on the probe, over the wide temperature extremes of industrial process level environments. They also have limited level range capability.

Guided wave radar is one technique available to measure the level of liquids or solids in an industrial environment using TDR principles. Guided wave radar works by generating a stream of pulses of electromagnetic energy and propagating the pulses down a transmission line formed into a level sensing probe. The probe is generally placed vertically in a tank or other container and the electromagnetic pulse is launched downward from the top of the probe. The probe is open to both the air and the material to be sensed in such a way that the electromagnetic fields of the propagating pulse penetrate the air until they reach the level of the material. At that point, the electromagnetic fields see the higher dielectric of the material. This higher dielectric causes a reduction in the impedance of the transmission line, resulting in a pulse echo being reflected back to the top of the probe. The pulse travels through the air dielectric portion of the probe at a known velocity. This allows the material level on the probe to be determined by measuring the round trip travel time of the pulse from the top of the probe to the level and back to the top of the probe. Conductive materials generate echoes similar to the echoes from high dielectric materials. Therefore, the same measurement technique also works with conductive materials.

Guided wave radar measurement instruments measure the time of flight from a known location, referred to as a fiducial, at the top of the probe to the surface of the material of interest in which the probe is immersed. The time of flight is used to calculate distance based on knowledge of the velocity of propagation of the radar pulse through the atmosphere above the surface of the material. Such a measurement instrument is calibrated in room air to determine the effective velocity of propagation. In most applications the velocity of propagation under process conditions differs negligibly from room air. However, in some applications, notably high pressure steam and hydrocarbons, the actual velocity of propagation through the vapor phase differs substantially from the calibrated velocity. This difference can introduce significant error into the distance calculation. Moreover, the propagation velocity may vary in time as process conditions change.

When the process also involves high temperature, the apparent position of the fiducial shifts as the temperature of the solid materials between the fiducial and process vapor rise. This increases the measured time of flight.

The present invention is directed to overcoming one or more of the problems discussed above, in a novel and simple manner.

SUMMARY OF THE INVENTION

In accordance with the invention there is provided a guided wave radar transmitter with automatic velocity compensation.

Broadly, in accordance with one aspect of the invention there is disclosed a guided wave radar transmitter comprising a probe defining a transmission line including a relatively low impedance change target marker above an expected sensing region of the probe. A pulse circuit is connected to the probe for generating pulses on the transmission line and receiving a reflected signal from the transmission line. The reflected signal selectively includes a target pulse representing the target marker and a level pulse representing material along the length of the probe. A controller is operatively connected to the pulse circuit. The controller normally operates at a relatively low gain to determine a level time to the level pulse to determine material level, and periodically operates at a relatively high gain to determine a target time to the target pulse. The target time is used to compensate the level time for properties of vapor above the material level.

There is disclosed in accordance with another aspect of the invention a time domain reflectometry measurement instrument including a probe defining a transmission line and including a reference marker proximate a top end of the probe and a relatively low impedance change target marker above an expected sensing region of the probe. A pulse circuit is connected to the probe for generating pulses on the transmission line and receiving a reflected signal from the transmission line. The reflected signal selectively includes a fiducial pulse representing the reference marker, a target pulse representing the target marker and a level pulse representing material along the length of the probe. A time sampling circuit is connected to the pulse circuit for developing a time representation of the reflected signal. A controller is operatively connected to the pulse circuit and the time sampling circuit. The controller comprises measurement means operating at a relatively low gain for determining a level time between the fiducial pulse and the level pulse to determine material level. Target means operate at a relatively high gain to determine a target time between the fiducial pulse and a target pulse. The controller selectively operates either the measurement means or the target means. The target time is used to compensate the level time for properties of vapor above the material level.

There is disclosed in accordance with a further aspect of the invention a guided wave radar transmitter comprising a probe defining a transmission line and including a reference marker proximate a top end of the probe and a relatively low impedance change target marker above an expected sensing region of the probe. A pulse circuit is connected to the probe for generating pulses on a transmission line and receiving a reflected signal from the transmission line. The reflected signal selectively includes a fiducial pulse representing the reference marker, a target pulse representing the target marker and a level pulse representing material along the length of the probe. The controller is operatively connected to the pulse circuit. The controller normally operates at a relatively low gain to determine a level time between the fiducial pulse and the level pulse to determine material level based on the level time, and periodically operates at a relatively high gain to determine a target time between the fiducial pulse and the target pulse. The determined target time is compared to a calibrated target time, representing propagation through air, to determine a velocity compensation amount. The velocity compensation amount is used to compensate the level time for properties of vapor above the material level.

Further features and advantages of the invention will be readily apparent from the specification and from the drawings.

DETAILED DESCRIPTION OF THE INVENTION

Figure 1:
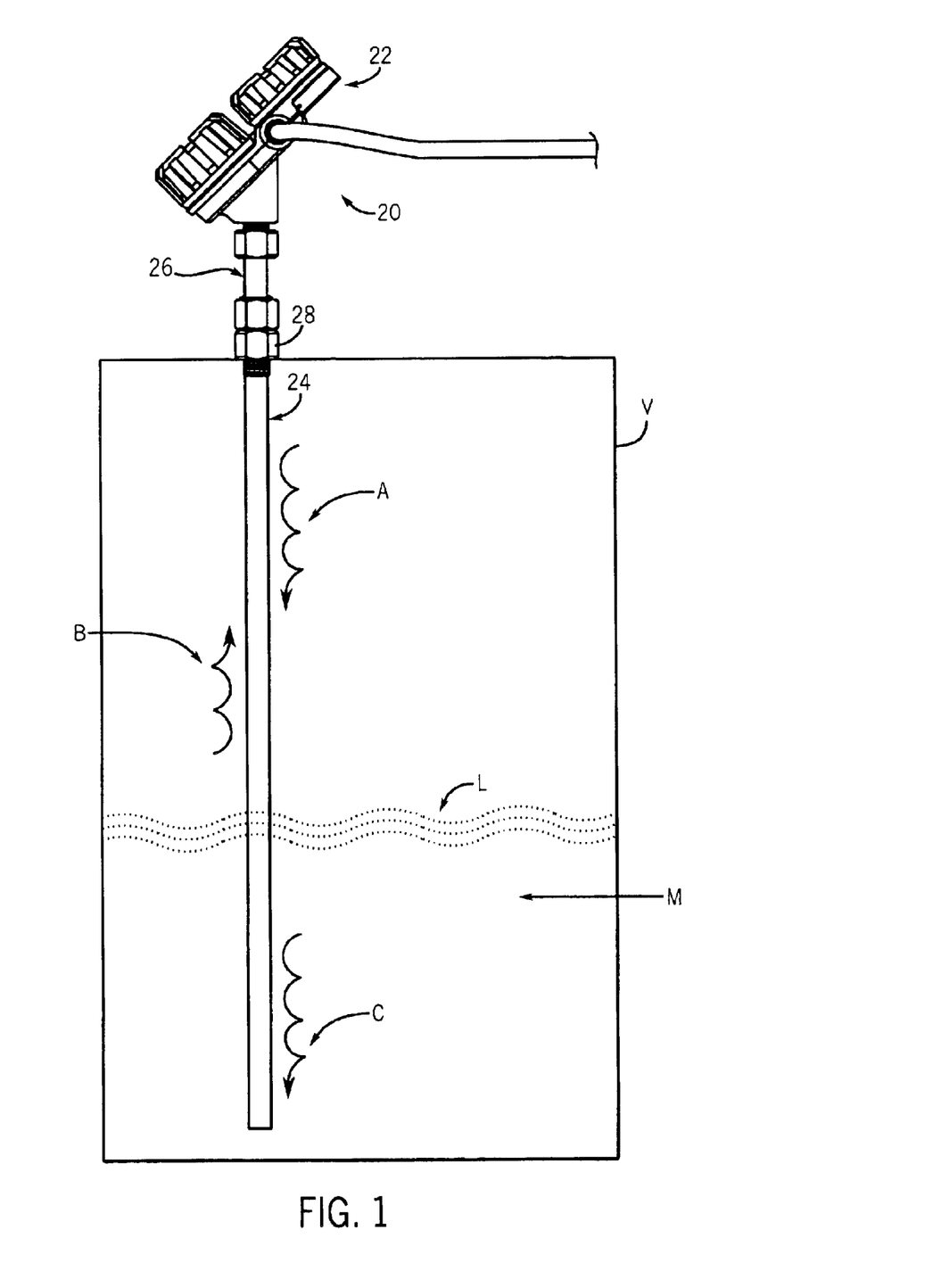
FIG. 1 is a side elevation view of a measurement instrument in accordance with the invention.

Referring to FIG. 1, a process instrument 20 according to the invention is illustrated. The process instrument 20 uses micropower impulse radar (MIR) in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to an MIR level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is typically mounted to a process vessel V using a threaded fitting 28. Alternatively, a flange may be used. The housing 22 is then secured to the probe 24 as by threading the connector 26 to the probe 24 and also to the housing 22. These components may be as generally described in Mulrooney et al., U.S. Pat. No. 6,062,095, the specification of which is hereby incorporated by reference herein. As described therein, the probe 24 comprises a high frequency transmission line which, when placed in a fluid, can be used to measure level of the fluid. Particularly, the probe 24 is controlled by a controller, described below, in the housing 22 for determining level in the vessel.

As described more particularly below, the controller in the housing 22 generates and transmits pulses A on the probe. A reflected signal B is developed off any impedance changes, such as a liquid surface L of a material M being measured. A small amount of energy, C, may continue down the probe.

Figure 2:
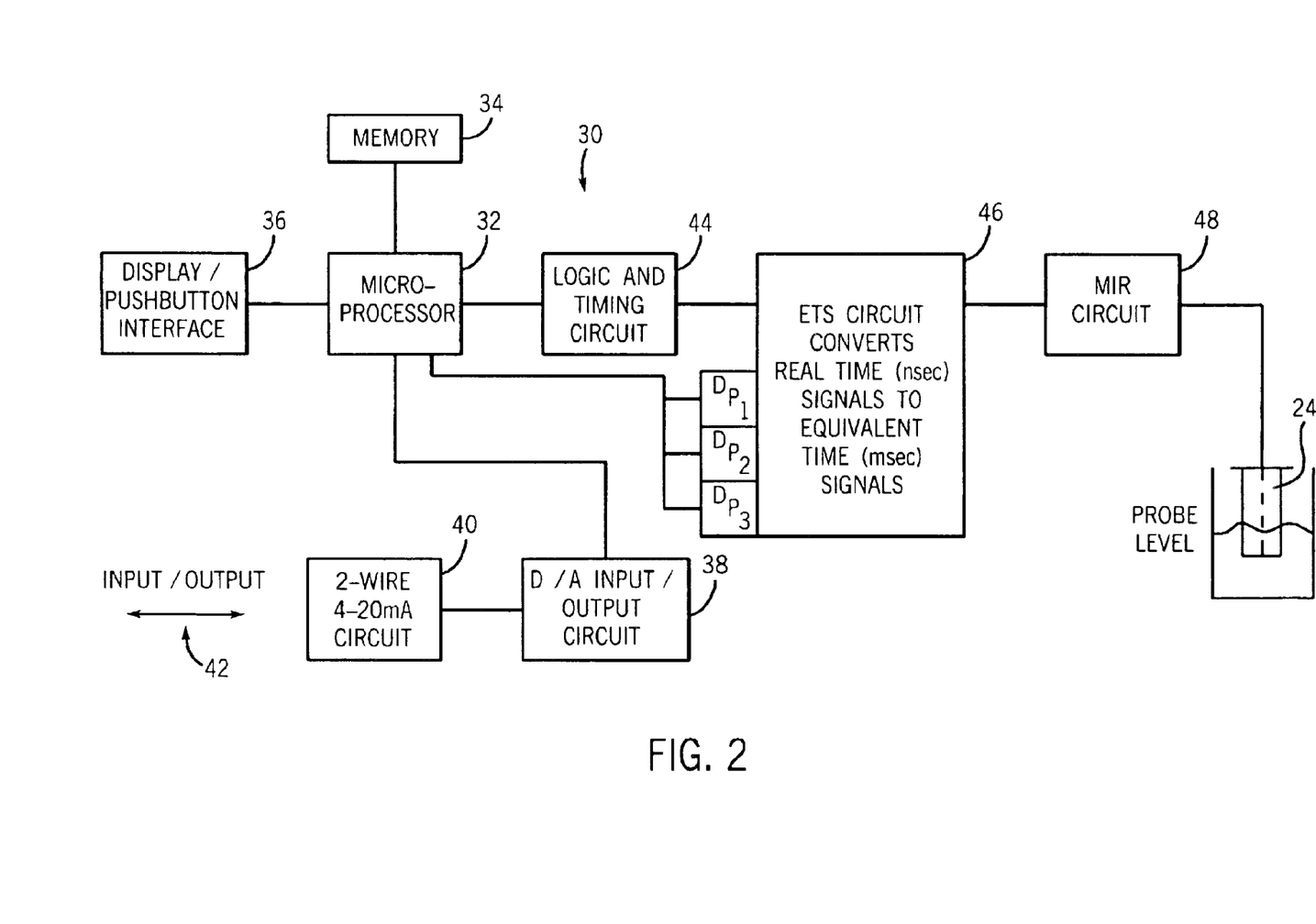
FIG. 2 is a block diagram of a control circuit for the instrument of FIG. 1.

Referring to FIG. 2, the controller mounted in the housing 22 of FIG. 1 is illustrated in block diagram form as a control circuit 30 connected to the probe 24. The control circuit 30 includes a microprocessor 32 connected to a suitable memory 34 (the combination forming a computer) and a display/pushbutton interface 36. The display/push button interface 36 may be as generally described in the Mulrooney et al. patent incorporated by reference herein, and is used for entering parameters with a keypad and displaying user information. The memory 34 comprises both non-volatile memory for storing programs and calibration parameters, as well as volatile memories used during level measurement, as described below.

The microprocessor 32 is also connected to a digital to analog input/output circuit 38, which is in turn connected to a two-wire 4–20 mA circuit 40 for connecting to remote devices as represented by an input/output line 42. Particularly, the two-wire circuit 40 utilizes loop control and power circuitry which is well known and commonly used in process instrumentation. The power is provided on the line 42 from an external power supply. The circuit 40 controls the current on the two-wire line 42 which represents level or other characteristics measured by the probe 24.

The microprocessor 32 is also connected via a logic and timing circuit 44 to an ETS circuit 46. The logic and timing circuit 44 converts signals to appropriate levels and coordinates timing of such signal levels. The ETS circuit 46 is connected via an MIR circuit 48 to the probe 24. The ETS circuit 46 and the MIR circuit 48 are known and are generally in accordance with the teachings of McEwan, U.S. Pat. Nos. 5,345,471 and 5,609,059, the specifications of which are hereby incorporated by reference herein. The MIR circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since the pulses travel in the probe at the speed of light, this picture represents approximately ten nanoseconds in real time for a five-foot probe. The ETS circuit 46 converts the time to about 71 milliseconds. As is apparent, the exact time would depend on various factors, such as, for example, probe length. The largest signals have an amplitude of the order of 20 millivolts before amplification to the desired amplitude by common audio amplifiers. For a low power device, a threshold scheme is employed to give timed interrupts to the microprocessor 32 for select signals, namely, fiducial, target, level, and end of probe, as described below. The microprocessor 32 converts these timed interrupts into distance. With the probe length entered through the display/pushbutton interface 36, or some other interface, the microprocessor 32 can calculate the level by subtracting from the probe length the difference between the fiducial and level distances.

The known ETS circuit 46 is modified to include digital control by the microprocessor 32 of selected circuit parameters. Three digital potentiometers labeled DP1, DP2 and DP3 receive digital commands, having one of 256 settings representing desired resistance, from the microprocessor 32. The commanded resistance varies operation of the ETS circuit 46 for controlling the signal sent via the logic and timing circuit 44 to the microprocessor 32. The adjustments made by the respective digital potentiometers DP1, DP2, and DP3 are range, window and gain.

The MIR circuit 48 generates and transmits a measurement pulse at some known time. A reflected fiducial signal is a reference signal based on a marker built into the instrument 20. Typically, the fiducial is positioned at some location along the probe, such as the top of the probe, higher than a highest level that can be sensed. This permits level measurement all the way to the top of the probe. The ETS circuit 46 is configured to look for a return signal only in a region of interest (ROI). A window is defined as a time from when the pulse is transmitted to the beginning of the region of interest. The ETS circuit 46 then looks for the received pulses only within the region of interest. The ETS circuit 46 also utilizes an adjustable range. The range represents the length of the ROI beyond the end of the window to look for return signals. The first digital potentiometer DP1 is used to adjust the range. The second digital potentiometer DP2 is used to adjust the window. The range may be adjusted to include the fiducial signal and the end of probe signal.

The third potentiometer DP3 is used for the gain adjustment. The gain adjustment controls the amplitude of the return signal. The amount of reflected energy depends on the dielectric of the material. The gain adjustment controls the amplitude of the analog signal regardless of the media.

The window and range are influenced by the tolerances of the electronic components of a given circuit board. This relationship is determined during the factory calibration of the electronics. The relevant calibration parameters are stored in an onboard memory by factory personnel. If a board has to be replaced in the field, then a new one is installed and the pertinent setup parameters are entered. No additional calibration with test equipment, potentiometer adjustments, or level measurement is necessary.

The proper combination of range and window adjustment allows increased resolution and accuracy of level measurements by "zooming in" on the ROI. Such ROI may be an interface between air and liquid, or an interface between air and solids, or an interface between two liquids, or any other area along the probe. The microprocessor 32 and digital potentiometers DP1–DP3 allow setting the location and size of the ROI and maintaining information about such selection with respect to the overall distance.

Figure 3:
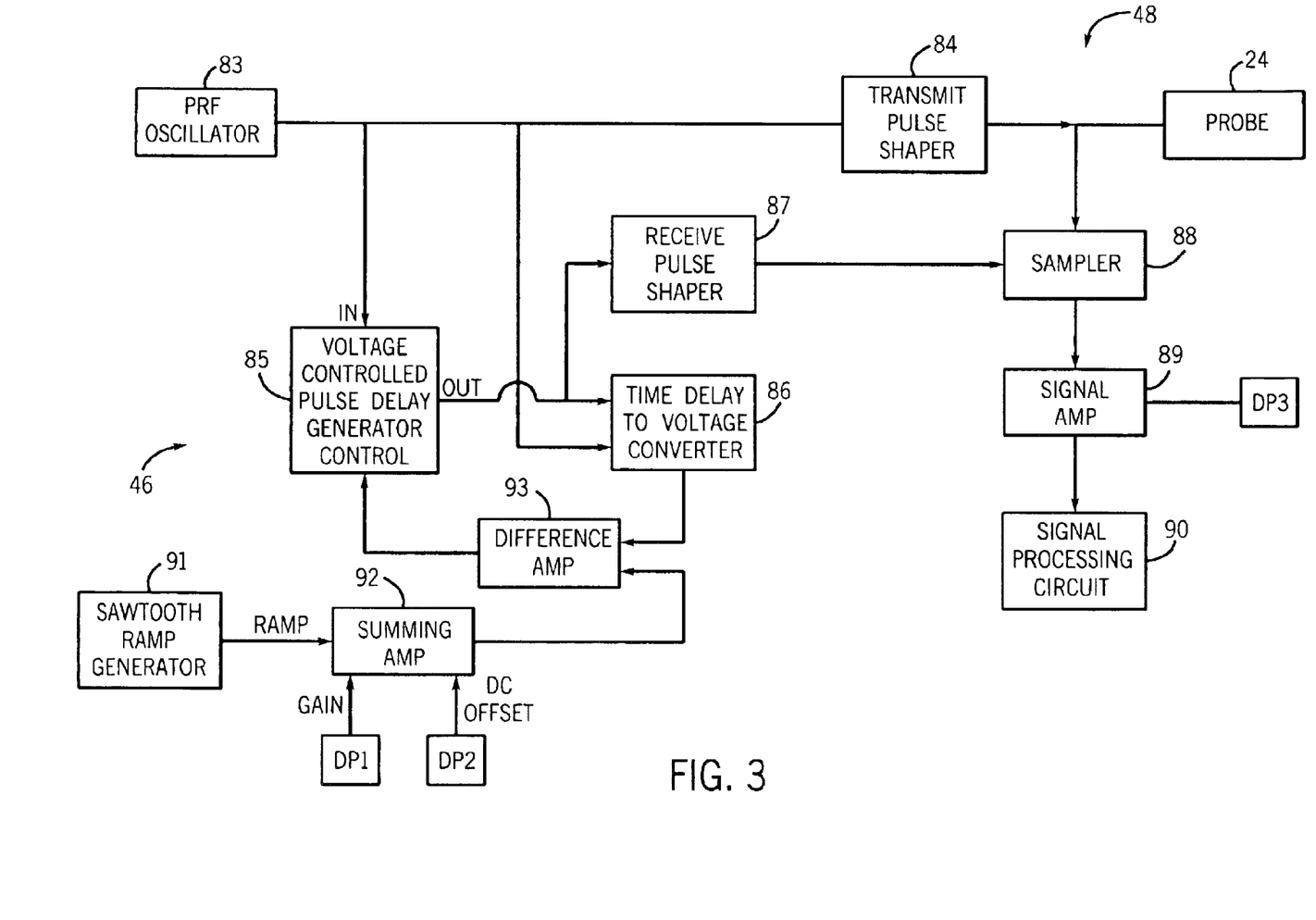
FIG. 3 is a block diagram of the ETS circuitry and MIR circuitry for the control circuit of FIG. 2.

As discussed above, the ETS circuit 46 is modified to include the digital potentiometers DP1–DP3. Referring to FIG. 3, a block diagram illustrates the modified ETS circuit 46 and the MIR circuit 48 in block diagram form.

A pulse repetition frequency (PRF) oscillator 83 is connected to a transmit pulse shaper 84 which is in turn connected to the probe 24. The oscillator 83 is also connected to a pulse input of a voltage controlled pulse delay generator 85. Pulse outputs of the delay generator 85 and the oscillator 83 are also connected to a time delay to voltage converter 86. The output of the delay generator 85 is also connected to a receive pulse shaper 87 that is connected to a sampler 88. The sampler 88 is connected to the probe. An output of the sampler 88 is connected to a signal amplifier 89 which includes the gain digital potentiometer DP3. The signal amplifier 89 is in turn connected to a signal processing circuit 90 which transfers the return pulse signal to the microprocessor 32 of FIG. 2.

A sawtooth ramp generator 91 develops a sawtooth ramp as an input to a summing amplifier 92. The summing amplifier 92 is connected to the range potentiometer DP1 and the window potentiometer DP2. The range potentiometer DP1 sets gain, while the window potentiometer DP2 sets a DC offset applied to the ramp signal from the ramp generator 91. The output of the summing amplifier 92 is supplied as an input to a difference amplifier 93. The other input to the difference amplifier 93 is an output from the time delay to voltage converter 86. These input signals represent respectively a desired delay and an actual delay. The output of the difference amplifier is an error signal which is supplied to a control voltage input of the pulse delay generator 85.

The PRF oscillator 83 generates a pulse train at the frequency of the transmitted pulses. For each input pulse, the pulse delay generator 85 generates an output pulse with a delay that is controlled by its control voltage input. The delayed pulse passes through the receive pulse shaper 87 and is provided to the sampler 88. The sampler 88 samples the reflected pulses from the probe 24 at a time determined by the delayed and shaped receive pulse. The resulting low frequency sampled signal is amplified and passed on to further signal processing circuits 89 and 90. The amplifier gain is controlled by the computer controlled gain digital potentiometer DP3.

The PRF oscillator signal and the delayed pulse also are inputs to the time delay to voltage converter 86. The output of this converter 86 is a voltage proportional to the actual time delay between the transmit pulse from the PRF oscillator 83 and the receive pulse from the pulse delay generator 85. The voltage representing the measured delay is subtracted from a voltage representing the desired delay by the difference amplifier 93. The difference amplifier 93 output is an error signal that controls the time delay in the voltage controlled pulse delay generator 85. This feedback loop measures the actual pulse delay, compares it to the desired pulse delay, and forces the voltage controlled pulse delay generator 85 to adjust the actual pulse delay until it matches the desired delay. In this way, most nonlinearities and drifts in the voltage controlled pulse generator 85 have little or no effect on the actual pulse delay.

The voltage representing the desired delay is produced by the sawtooth ramp generator 91 and the summing amplifier 92. The summing amplifier amplifies the sawtooth ramp signal and adds a DC offset to the resulting signal. The DC offset voltage and the gain of the summing amplifier are controlled by the respective computer controlled digital potentiometers DP2 and DP1.

Automated control of the window (DC offset) and range (sawtooth ramp gain) using the potentiometers DP1 and DP2 allows the microprocessor 32 to control the starting voltage and ending voltage of the sawtooth ramp representing the desired time delay, and therefore to control through the feedback loop the starting and ending time delay values actually applied to the sampler 88. Controlling these time delays, in turn, controls the distance down the probe 24 that the scan begins and ends, allowing the microprocessor 32 to scan any small or large portion of the probe as may be needed to easily identify a level reflection from the probe 24. All spurious signals, as reflections occurring from locations outside the scanned interval, are not seen by the signal processing circuits.

Microprocessor control of the gain potentiometer DP3 allows for adaptation to differing signal levels caused by differing dielectric constants of the reflecting medium and for differing signal amplitudes resulting from differing probe configurations.

The control circuit 30 has the capability of implementing digital communications through the two-wire circuit 40 and the line 42 with remote devices and the outside world. Such communication preferably uses the HART protocol, but could also use fieldbus protocols such as Foundation Fieldbus or Profibus PA.

The control circuit 30 determines level using a program stored in the memory 34 and implemented by the microprocessor 32, see FIG. 2. The basic routine for level measurement may be as generally described in Benway et al. U.S. patent application Ser. No. 09/878,895, filed Jun. 11, 2001, the specification of which is hereby incorporated by reference herein. The instrument 20 in accordance with the invention is further enhanced to provide automatic velocity compensation for high temperature and pressure applications. This is done by adding a minor discontinuity near the top of the sensing region of the probe 20 to create a target producing a weak level signal at a known location. When the material M is below the discontinuity, the time of flight to the target gives an indication of the velocity of propagation to the material surface, permitting compensation for the effects of high temperature, high pressure and composition of the vapor phase. Calibration of the target location in room air removes the effect of variations in geometry and signal shape. Automatic gain control during a target scan improves the precision of the velocity measurement and accuracy of the compensation.

Figure 4:
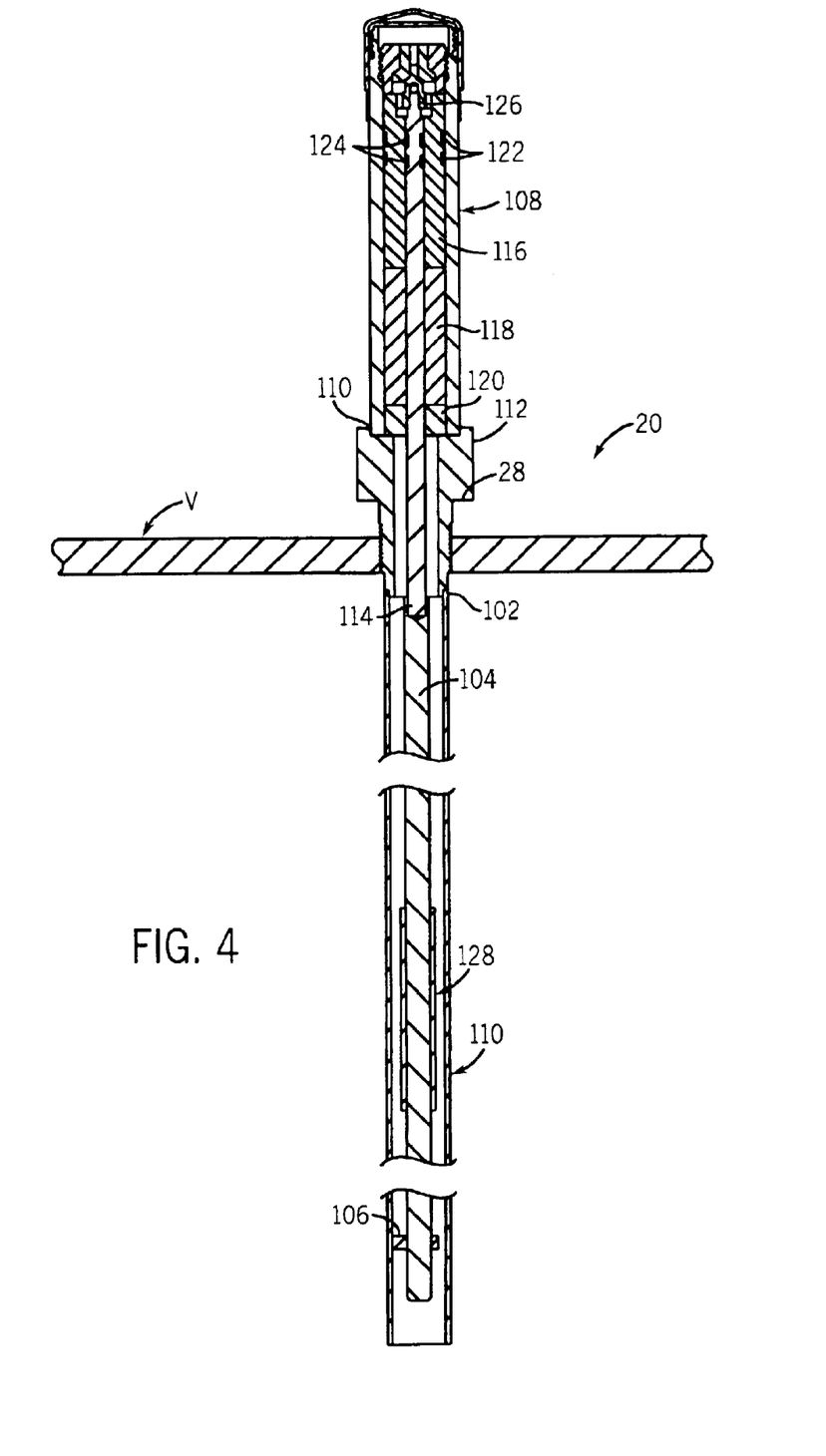
FIG. 4 is a cross section of the probe used in the measurement instrument of FIG. 1.

Referring to FIG. 4, the probe 20 is illustrated in cross section. An outer sleeve 100 is connected to the fitting 28 at 102. A probe extension shaft 104 extends through the sleeve 100 and is separated from the sleeve 100 using spacers 106. The length of the probe extension shaft 104 and sleeve 100 depend on the particular application but are of approximately equal length, as illustrated. A probe head outer body 108 is connected to the outside of the fitting 28 as at 110. A probe head inner shaft 112 extends through the probe head outer body 108 and is connected to the probe extension shaft 104 at a connection point 114 just below the threaded fitting 28. Probe seal inserts 116, 118 and 120 seal and maintain spacing between the probe head outer body 108 and the probe head inner shaft 112. O-rings 122 and 124 provide a seal between the upper most probe seal insert 116 and the probe head outer body 108 and probe head inner shaft 112, respectively. In the illustrated embodiment of the invention, the two upper most probe seal inserts 116 and 118 are formed of a thermoplastic material. The lower most probe seal insert 120 is of a ceramic material. The use of such materials allows the probe 20 to be used in high temperature applications by isolating the O-rings 122 and 124 from the process. A connector pin 126 is connected atop the probe head inner shaft for providing a connection to the control circuit 30.

A metal sleeve 128, defining a compensation target, is tack welded to the probe extension shaft 104 at a location above an expected region of interest of the probe 20. The reduced annulus created by the sleeve 128 provides a relatively small impedance change along the probe 20. The small impedance change produces a relatively low level signal that is detected only at relatively high gain.

Figure 5:
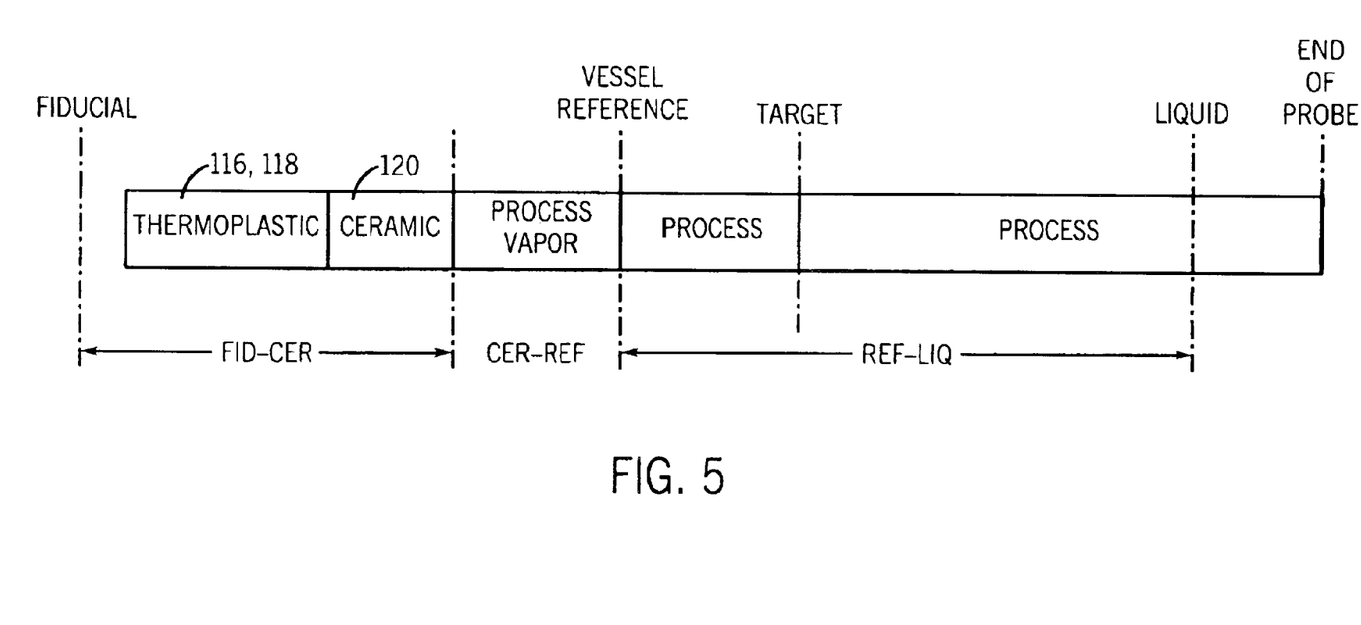
FIG. 5 is a schematic diagram illustrating impedance changes along the probe of FIG. 4.

The transmission line comprises the combination of the probe head inner shaft 112 and the probe extension shaft 104 relative to the probe head outer body 108 and its sleeve 100. Referring to FIG. 5, a probe schematic diagram illustrates the surrounding media at any point along the length of the transmission line. A reference marker or fiducial is provided at about the connector 126, see FIG. 4, before the probe seal inserts 116, 118 and 120.

Thereafter, the transmission line is exposed to process vapor above the material, referred to as process in the schematic diagram. A point labeled "Vessel Reference" refers to an arbitrary reference point designated at the top of the vessel V. The Vessel Reference is selected to be a fixed offset from the fiducial and is used in level measurement. The target marker, provided by the sleeve 128, is shown between the reference and the label "liquid" defining the location of the material being sensed. As is apparent, the material will be sensed when it is between the liquid and Vessel Reference point and the end of the probe along the flight path.

In the exemplary embodiment of the invention, the transmission line has an impedance on the order of fifty Ohms. The impedance at the fiducial may be on the order of about forty-four Ohms. This is a relatively small impedance change compared to the impedance change typically evident at the location of the material being sensed which is on the order of zero Ohms for a process material such as water. The control circuit 30 can be configured to automatically adjust amplification of the sampled return signal for the impedance change at the fiducial relative to the impedance change at the location of the material being sensed, as described in application Ser. No. 09/878,895, incorporated by reference herein. The target marker provided by the target 128 in the exemplary embodiment of the invention may have an impedance on the order of thirty-four Ohms. This provides a relatively small impedance change compared to that of the material being sensed.

In the illustrated embodiment of the invention, the probe 24 comprises a coaxial probe. As will be apparent to those skilled in the art, the probe could comprise a single rod probe by eliminating the sleeve 100 or could comprise a twin rod probe.

In accordance with the invention, the measurement instrument 20 is calibrated to correlate the measured time of flight from the fiducial to the liquid surface with the distance from the Vessel Reference point to the liquid surface. If the properties of the vapor phase above the liquid surface cause the velocity of propagation to deviate significantly from the calibration conditions, then the velocity of propagation through the vapor phase is calculated to compensate for these variations. Also, as the temperature of solid materials between the fiducial and the process vapor rise, the apparent position of the fiducial shifts, increasing the measured time of flight to the Vessel Reference, target and liquid surface. Although this increase is small, its effect is magnified by the velocity compensation described herein. In accordance with the invention, the measured time of flight is compensated for this effect, without a direct temperature measurement, to improve overall accuracy of the system.

As described above, radar scans are initiated at approximately 100 millisecond intervals. In accordance with the invention, most of the scans are run at a standard gain which is too low for the compensation target 128 to produce a detectable pulse, allowing the time of flight to the material surface to be measured in the conventional manner. A small fraction of the scans are run at high gain so that the compensation target 128 produces a detectable level pulse. In an exemplary embodiment of the invention, one out of eight scans are run at high gain.

Figure 6:
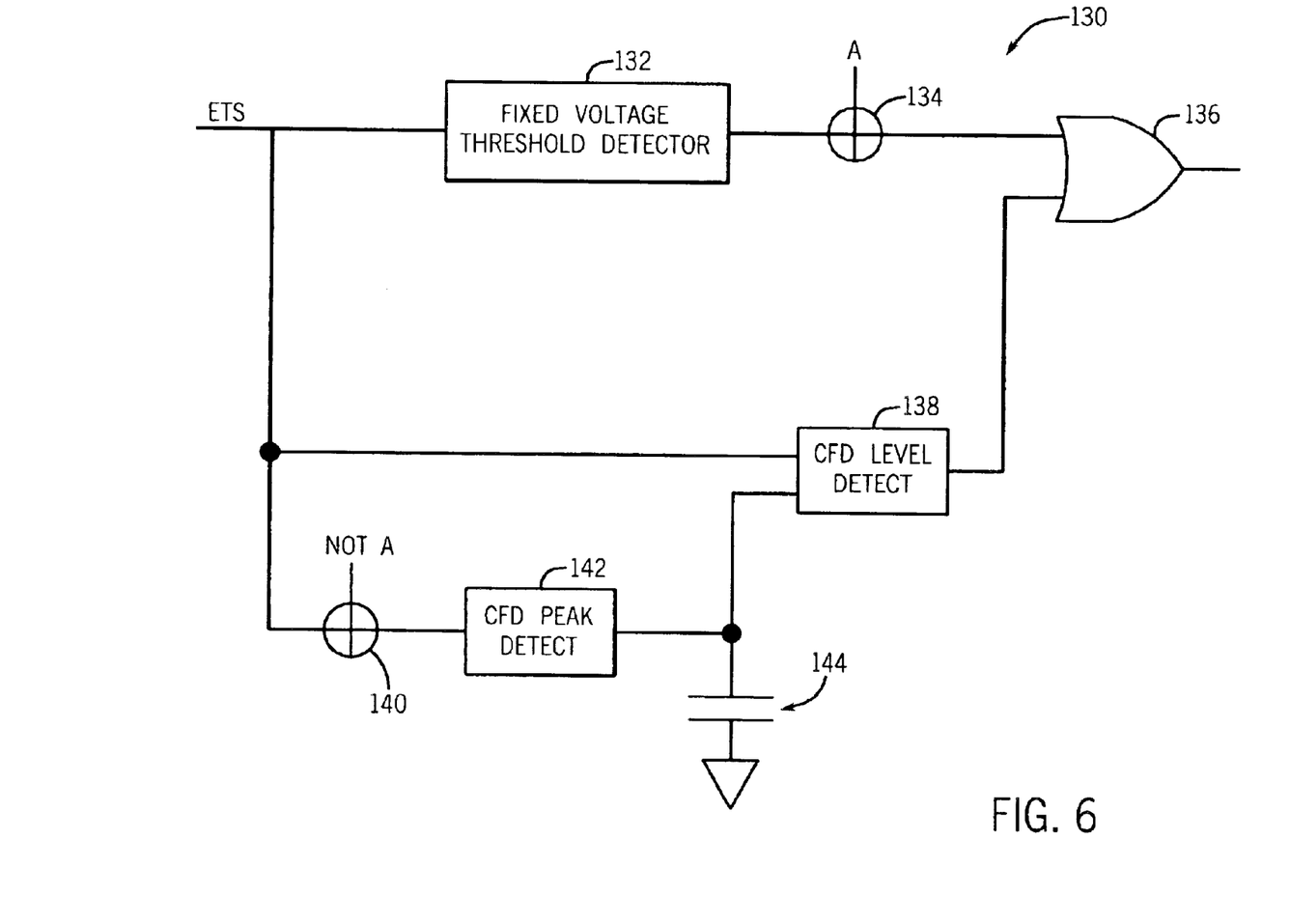
FIG. 6 is an electrical schematic diagram of a pulse detection circuit in accordance with the invention.

The control circuit 30 includes an echo pulse detector circuit 130, see FIG. 6. The pulse detector circuit 130 may be implemented in the signal processing circuit 90 of FIG. 3. The pulse detector circuit receives the equivalent time sampling (ETS) echo signal discussed above. The ETS echo signal is provided to a fixed voltage threshold detector 132. The output of the fixed voltage threshold detector is provided via a selector switch 134 to one input of an OR gate 136. The ETS echo signal is also an input to a constant fraction discriminator (CFD) level detect block 138 having its output connected as an input to the OR gate 136. The output of the OR gate 136 comprises a pulse signal. The microprocessor 32 of FIG. 2 times the intervals between pulses in the pulse train, as described above. The ETS echo signal is also provided via a second selector switch 140 to a CFD peak detect circuit 142 which drives a holding capacitor 144. The holding capacitor 144 provides an automatic level set value to the CFD level detect circuit 138. The constant fraction discriminator adjusts the threshold of the sensor to a constant fraction of the peak amplitude of the pulse echoed from the material surface. The holding capacitor 144 holds a charge related to the peak pulse amplitude. However, if the CFD circuit was also used to detect the target, then the signals would interact and compromise the accuracy of both measurements. To avoid this interaction, the CFD circuit is disabled via the selector switch 140 during the target scan and the sensor threshold is set to the fixed voltage by enabling the selector switch 134. Conversely, during normal operation, the selector switch 134 is disabled, while the second selector switch 140 is enabled. Because of the non-sharp nature of the target pulse, the measured time of flight to the target is sensitive to the amplitude of the target pulse which is controlled by the amplifier gain applied during the target scan. In general, the amplitude and shape of the target pulse will vary with the process vapor characteristics, introducing a significant source of error in the compensation.

The variation of the target time of flight due to gain is effectively eliminated with automatic gain control for the target scans. This is accomplished with a discrete feedback system. After each target scan with the material level sufficiently low to allow the target to be seen, if a target pulse is detected, then the target scan gain is reduced by a fixed amount. Conversely, if no target pulse is detected the target scan gain is increased incrementally. When the system reaches equilibrium, the gain dithers by one step. Target time of flights are measured on about half of the target scans very near to the peak of the non-sharp pulse. This methodology similarly applies to the room air target calibration and to the target time of flight measurement in the process, automatically adjusting for the attenuation of the radar pulse in the process vapor.

Figure 7:
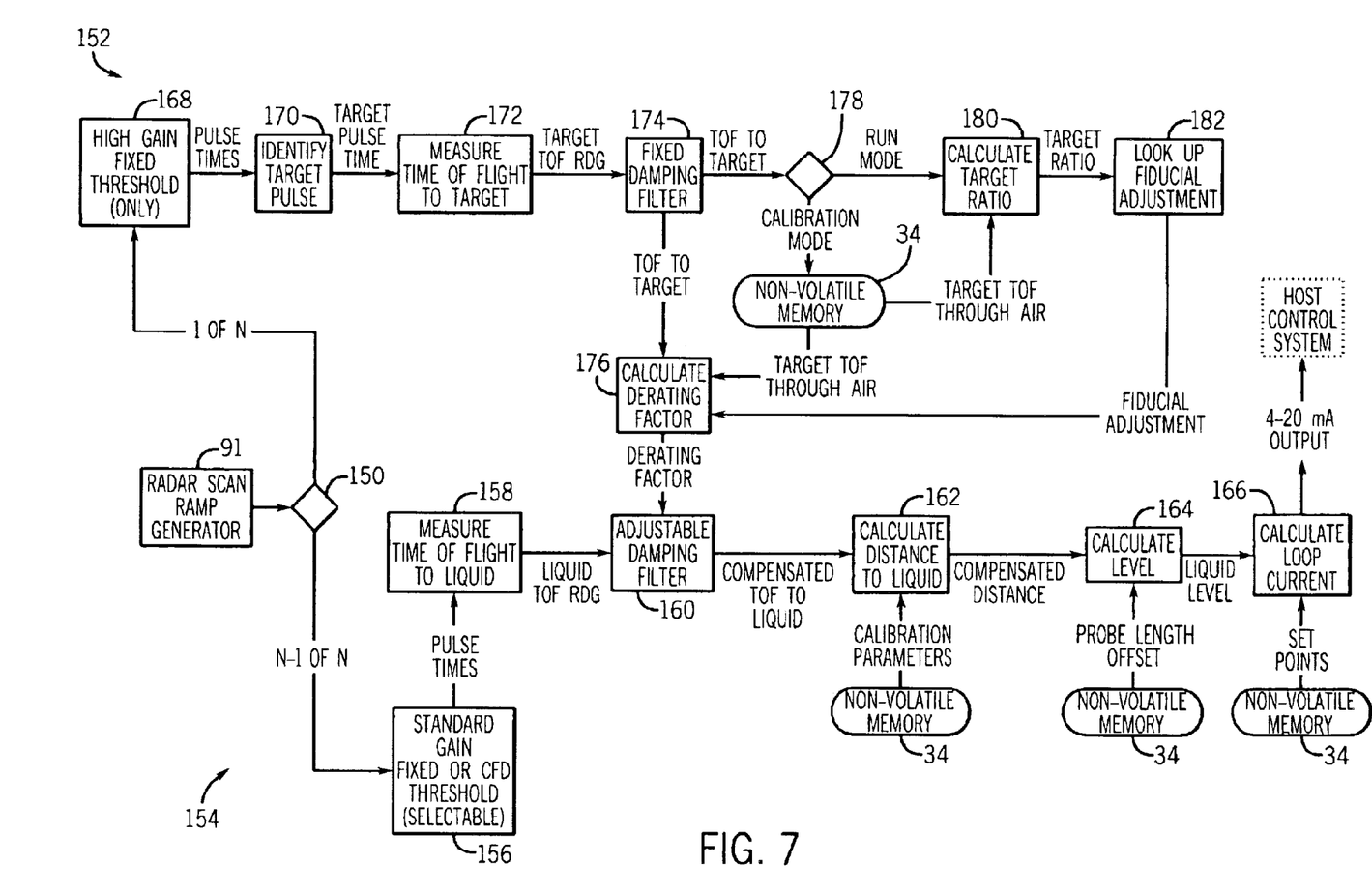
FIG. 7 is a high level flow diagram illustrating operation of the measurement instrument of FIG. 1.

Referring to FIG. 7, a flow diagram provides a high level illustration of the operation of the control circuit 30. The radar scan ramp generator 91, discussed above relative to FIG. 3, initiates each scan. A decision block 150 determines if the control circuit 30 should implement the normal measurement routine or the target measurement routine. As discussed above, 1 of every N scans follow a target measurement path 152 and the remaining N−1 of the N scans follow the normal measurement path 154.

The normal measurement path 154 operates at a normal, or relatively low gain, set via the potentiometer DP3, as discussed above, so that the target pulse is not detected. The control circuit 30 can use either the fixed voltage threshold detector 132 or the CFD level detector 138, see FIG. 6, at a block 156. The output of the OR gate 136 of FIG. 6 is provided to a block 158 which measures the time of flight to the liquid surface. This time of flight may be represented by "tic" counts in the microprocessor 30. The time of flight reading is provided to an adjustable damping filter 160 to eliminate measurement jitter. The damping filter 160 also provides first and second order compensation adjustments, as discussed below. The compensated time of flight to the liquid surface is then used in a conventional manner to calculate distance to liquid using calibration parameters stored in the memory 34 at a block 162. The compensated distance is converted to level at a block 164 using the probe length and an offset value stored in the memory 34. Thereafter, loop current is calculated at a block 166 using set point values stored in the memory 34 and the 4–20 milliamp output is provided to an external host control system.

The target path 152 begins at a block 168 which sets a high gain using the potentiometer DP3 and uses the fixed voltage threshold detector 132, see FIG. 6. The block 168 may also implement the automatic gain control for target scans discussed above. The condensation on the lower surface of the ceramic seal insert 120 can produce a secondary level pulse under certain conditions, principally cool down. If this pulse is mistaken for the target, then inaccurate measurements can result. The control circuit 30 recognizes the double pulse situation and identifies the time of flight to the second pulse as the target pulse at a block 170. A time of flight to the target pulse is then measured at a block 172 which is provided to a fixed damping filter 174 to eliminate measurement jitter. The time of flight to the target is provided to a block 176, which calculates a derating factor, and to a selector 178. The selector 178 is used to select between a calibration mode and a run mode. The calibration mode is performed through room air. In this mode the apparent time of flight to the target is measured directly and stored in non-volatile memory 34. The calibrated target time of flight through air is provided to the block 176. It is also provided to a block 180 which calculates a target ratio. The block 180 also receives the time of flight to the target from the switch 178 during a normal or run mode.

The block 176 calculates a damped time of flight to the target by dividing the calibrated time of flight in air to the target by the time of flight to the target in process conditions to form a first order target ratio. This ratio is less than or equal to one as any real process vapor will retard the radar pulse compared with room temperature air.

The compensation for the fiducial shift due to temperature uses a correlation between process vapor temperature and the dielectric constant of the vapor phase. Since the change in dielectric constant affects the time of flight to the compensation target, and hence the target ratio, and the thermodynamic properties for a given material are related, the first order target ratio can be used to provide a first order estimate of the process vapor temperature. The observed fiducial shift caused by elevated probe temperature is correlated with the first order target ratio for process vapor over the conditions of interest in the form of a look up table. A block 182 receives the target ratio from the block 180 and develops a fiducial adjustment provided to the block 176. The fiducial adjustment is combined with the measured and calibrated times of flight to target to calculate a corrected target ratio or derating factor. The fiducial adjustment can be considered as a second order correction to the target ratio.

The derating factor, supplied to the adjustable damping filter 160, represents the predicted ratio of the reference to liquid time of flight through room temperature air to the measured time of flight through the actual process vapor. This derating factor is used to revise the time of flight to liquid reading as it passes through the adjustable damping filter 160. The output of the damping filter 160 is therefore the time of flight to the liquid surface, compensated for the effect of the temperature and pressure on the velocity of propagation through the process vapor and the second order effect of temperature on the apparent position of the fiducial. The compensated time of flight to the liquid is then used in the conventional manner described above in the blocks 162, 164 and 166 to calculate distance, level and loop current, respectively, as is done in a standard guided wave radar level transmitter.

Thus, in accordance with the invention, a time domain reflectometry measurement instrument, in the form of a guided wave radar level transmitter, compensates for the properties of vapor phase above the liquid surface.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

We claim:

1. A guided wave radar transmitter comprising:
a probe defining a transmission line and including a target marker above an expected sensing region of the probe, the target marker having a smaller impedance change on the transmission line than impedance chance of a material being sensed;
a pulse circuit connected to the probe for generating pulses on the transmission line and receiving a reflected signal from the transmission line, the reflected signal selectively including a target pulse representing the target marker and a level pulse representing material along length of the probe; and
a controller operatively connected to the pulse circuit, the controller normally operating at a first select gain to determine a level time to the level pulse to determine material level, and periodically operating at a second select gain to determine a target time to the target pulse, the second select gain being higher than the first select gain, the target time being used to compensate the level time for properties of vapor above the material level.

2. The guided wave radar transmitter of claim 1 wherein the probe comprises a probe shaft and the target marker comprises a sleeve secured to the probe shaft.

3. The guided wave radar transmitter of claim 1 wherein the controller stores a calibrated target time and compares the determined target time to the calibrated target time to compensate the level time for properties of vapor above the material level.

4. The guided wave radar transmitter of claim 1 wherein the controller stores a calibrated target time and determines a ratio of calibrated target time to the determined target time to compensate the level time for properties of vapor above the material level.

5. The guided wave radar transmitter of claim 4 wherein the ratio is used to determine approximate temperature and the controller adjusts time of a fiducial pulse responsive to the determined approximate temperature.

6. The guided wave radar transmitter of claim 1 wherein the pulse circuit comprises a constant fraction discriminator for determining pulse times and the constant fraction discriminator is disabled when the controller operates at the second select gain.

7. The guided wave radar transmitter of claim 1 wherein the controller comprises an automatic gain control of the second select gain.

8. The guided wave radar transmitter of claim 7 wherein the automatic gain control selectively increases or decreases the second select gain to ensure that the target pulse is sensed.

9. A time domain reflectometry measurement instrument comprising:
a probe defining a transmission line and including a reference marker proximate a top end of the probe and a target marker above an expected sensing region of the probe, the target marker having a smaller impedance chance on the transmission line than impedance change of a material being sensed;
a pulse circuit connected to the probe for generating pulses on the transmission line and receiving a reflected signal from the transmission line, the reflected signal selectively including a fiducial pulse representing the reference marker, a target pulse representing the target marker and a level pulse representing material along length of the probe; and
a time sampling circuit connected to the pulse circuit for developing a time representation of the reflected signal;
a controller operatively connected to the pulse circuit and the time sampling circuit, the controller comprising measurement means operating at a first select gain for determining a level time between the fiducial pulse and the level pulse to determine material level, and target means operating at a second select gain to determine a target time between the fiducial pulse and the target pulse, the second select gain being higher than the first select gain, the controller selectively operating either the measurement means or the target means, the target time being used to compensate the level time for properties of vapor above the material level.

10. The time domain reflectometry measurement instrument of claim 9 wherein the controller normally operates the measurement means and periodically operates the target means.

11. The time domain reflectometry measurement instrument of claim 9 wherein the probe comprises a probe shaft and the target marker comprises a sleeve secured to the probe shaft.

12. The time domain reflectometry measurement instrument of claim 9 wherein the controller stores a calibrated target time and the target means compares the determined target time to the calibrated target time to compensate the level time for properties of vapor above the material level.

13. The time domain reflectometry measurement instrument of claim 9 wherein the controller stores a calibrated target time and the target means determines a ratio of calibrated target time to the determined target time to compensate the level time for properties of vapor above the material level.

14. The time domain reflectometry measurement instrument of claim 13 wherein the ratio is used to determine approximate temperature and the controller adjusts time of the fiducial pulse responsive to the determined approximate temperature.

15. The time domain reflectometry measurement instrument of claim 9 wherein the pulse circuit comprises a constant fraction discriminator for determining pulse times and the constant fraction discriminator is disabled when the controller operates the target means.

16. The time domain reflectometry measurement of claim 9 wherein the controller comprises an automatic gain control of the second select gain.

17. The time domain reflectometry measurement instrument of claim 16 wherein the automatic gain control selectively increases or decreases the second select gain to ensure that the target pulse is sensed.

18. A guided wave radar transmitter comprising:
 a probe defining a transmission tine and including a reference marker proximate a top end of the probe and a target marker above an expected sensing region of the probe, the target marker having a smaller impedance change on the transmission line than impedance change of a material being sensed;
 a pulse circuit connected to the probe for generating pulses on the transmission line and receiving a reflected signal from the transmission line, the reflected signal selectively including a fiducial pulse representing the reference marker, a target pulse representing the target marker and a level pulse representing material along length of the probe; and
 a controller operatively connected to the pulse circuit, the controller normally operating at a first select gain to determine a level time between the fiducial pulse and the level pulse to determine material level based on the level time, and periodically operating at a second select gain to determine a target time between the fiducial pulse and the target pulse, the second select gain being higher than the first select gain, and comparing the determined target time to a calibrated target time, representing propagation through air, to determine velocity compensation amount, the velocity compensation amount being used to compensate the level time for properties of vapor above the material level.

19. A guided wave radar transmitter of claim 18 further comprising a time sampling circuit connected to the pulse circuit and operatively associated with the controller for developing a time representation of the reflected signal.

20. The guided wave radar transmitter of claim 18 wherein the probe comprises a probe shaft and the target marker comprises a sleeve secured to the probe shaft.

21. The guided wave radar transmitter of claim 18 wherein the controller stores a calibrated target time and compares the determined target time to the calibrated target time to compensate the level time for properties of vapor above the material level.

22. The guided wave radar transmitter of claim 18 wherein the controller stores a calibrated target time and determines a ratio of calibrated target time to the determined target time to compensate the level time for properties of vapor above the material level.

23. The guided wave radar transmitter of claim 22 wherein the ratio is used to determine approximate temperature and the controller adjusts time of the fiducial pulse responsive to the determined approximate temperature.

24. The guided wave radar transmitter of claim 18 wherein the pulse circuit comprises a constant fraction discriminator for determining pulse times and the constant fraction discriminator is disabled when the controller operates at the relatively high gain.

25. The guided wave radar transmitter of claim 18 wherein the controller comprises an automatic gain control of the high second select gain.

26. The guided wave radar transmitter of claim 25 wherein the automatic gain control selectively increases or decreases the second select gain to ensure that the target pulse is sensed.

* * * * *